United States Patent [19]

Hamilton

[11] 4,406,390
[45] Sep. 27, 1983

[54] CONTINUOUS MOTION, CONSTANT VELOCITY WEB FEEDING APPARATUS

[76] Inventor: Joel A. Hamilton, 101 Hardenburgh Ave., Demarest, N.J. 07627

[21] Appl. No.: 310,601

[22] Filed: Oct. 9, 1981

[51] Int. Cl.³ .................... B65H 17/34; F16H 37/16
[52] U.S. Cl. ................................. 226/112; 226/115; 226/162; 74/27
[58] Field of Search ............... 226/112, 158, 159, 162, 226/93, 111, 116, 115, 117, 108; 74/22 R, 22 A, 23, 27, 37, 25

[56] References Cited

U.S. PATENT DOCUMENTS

| 678,476 | 7/1901 | Crowell | 74/27 |
| 1,208,084 | 12/1916 | Bosch | 226/162 X |
| 1,537,749 | 5/1925 | Colgrove | 226/115 |
| 2,107,607 | 2/1938 | Gobel | 226/112 X |
| 3,403,831 | 10/1968 | Lawson, Jr. et al. | 226/116 X |
| 3,583,268 | 6/1971 | Scribner | 226/162 X |
| 3,733,773 | 5/1973 | Hamilton | 53/559 |
| 3,844,152 | 10/1974 | Peytavin | 226/112 X |

FOREIGN PATENT DOCUMENTS

| 261378 | 3/1912 | Fed. Rep. of Germany | 74/25 |
| 379644 | 8/1923 | Fed. Rep. of Germany | 74/25 |
| 544559 | 4/1942 | United Kingdom | 74/37 |

Primary Examiner—Stuart S. Levy
Assistant Examiner—Scott J. Haugland
Attorney, Agent, or Firm—Ralph R. Roberts

[57] ABSTRACT

This invention includes apparatus providing for continuous motion and constant velocity to a traveling web usually including at least one film. A pair of grippers are arranged to grasp the film and are alternately actuated to advance the web. Each of the grippers are carried on the distal end of a reciprocated member. A motor is connected to a first shaft to turn four sprockets carried thereon. Each sprocket engages a roller chain assembly arranged in an endless manner and disposed to be moved in an oblong path. The roller chains are moved in a reciprocable path by one of a pair of crank arms driving and moving Pitman arms connected thereto. The oblong roller chains are operatively connected to and move lever arms pivotally connected to drag links which in turn move the reciprocated members. The apparatus includes a crank arm, a Pitman arm, drag links and reciprocable member with each as an assembly moved one hundred eighty degrees out-of-phase with a like assembly. The reciprocable movement of the frame carrying the oblong roller chains lengthens the forward stroke and shortens the rearward stroke while the speed of the roller chain remains constant. An overlap of the gripper actuation is provided by reciprocably moving the frame carrying the roller chain while moving the roller chain at a constant speed.

38 Claims, 20 Drawing Figures

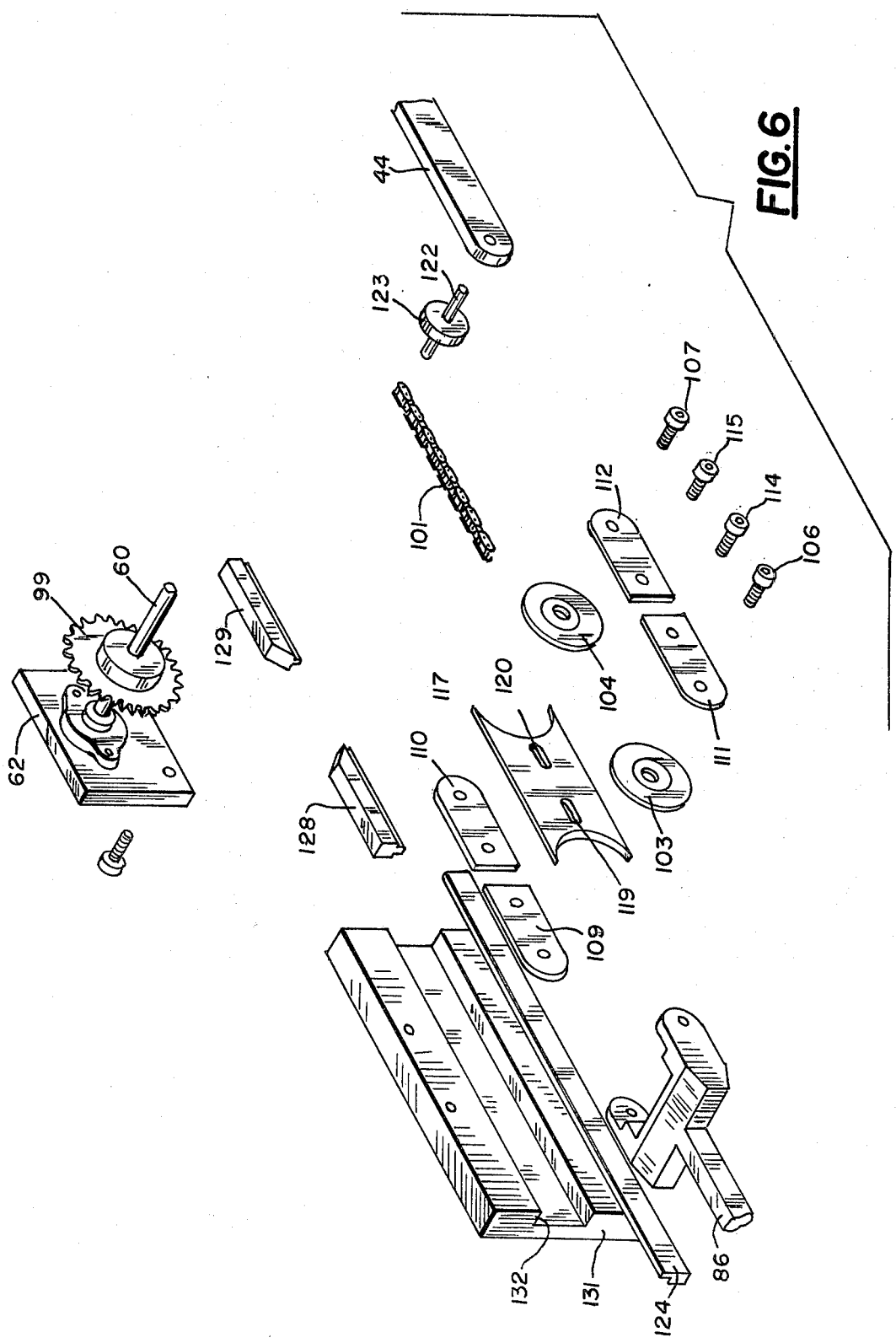

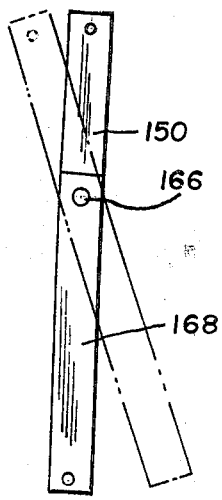
FIG. 8
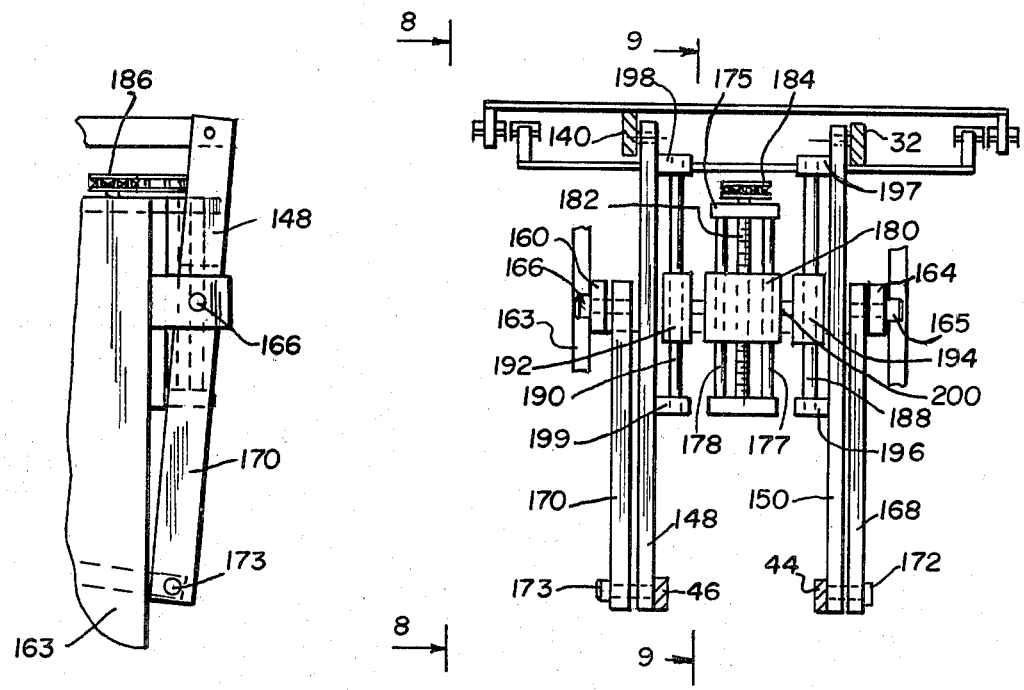
FIG. 7
FIG. 10B
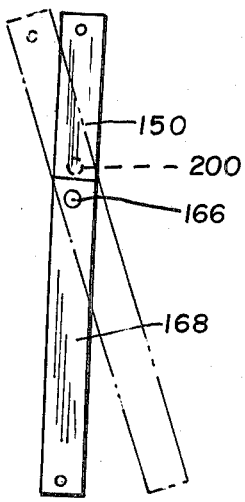
FIG. 10A

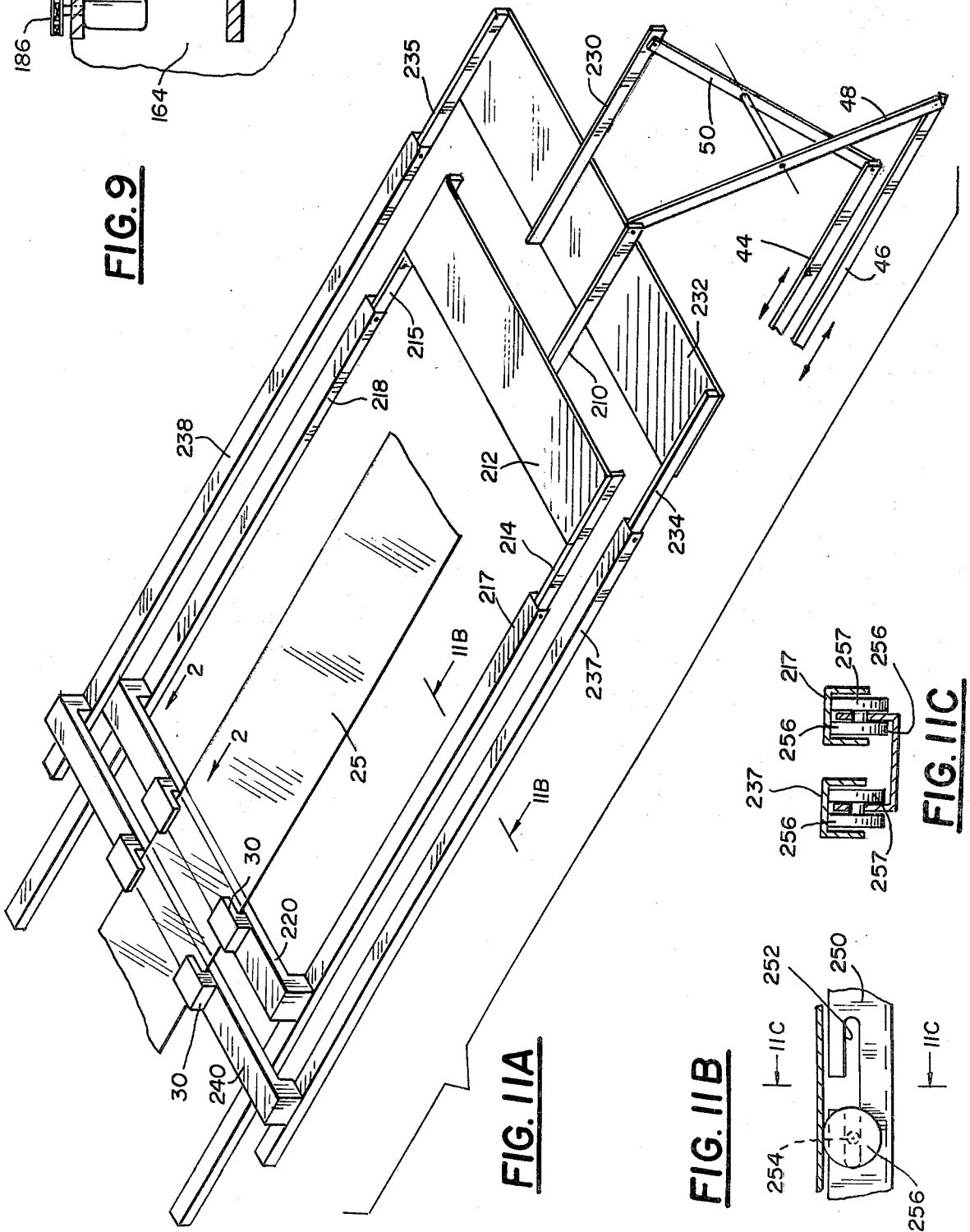

CONTINUOUS MOTION, CONSTANT VELOCITY WEB FEEDING APPARATUS

BACKGROUND OF THE INVENTION

1. Description of the Prior Art

The advancement of webs of material with a constant motion is found in several patents and apparatus in which alternate gripping and advancement are used is well known. In particular, applicant's U.S. Pat. No. 3,733,773 as issued May 22, 1973 is noted. In this and other showings the film or films are alternately gripped to advance the film or films. In this and other known apparatus, patented and unpatented, the film and/or films are gripped and the advance may be with a constant motion. The cams used in prior art devices may provide an overlap in the film advancing apparatus as is provided in the present invention. The crank arm moves the connected oblong array of roller chain so as to produce a continuous motion and constant velocity. The shortening or lengthening of the crank arm changes each gripper actuation and overlap in accordance with said length of crank arm.

In the course of a prior art search, in addition to U.S. Pat. No. 3,733,773 above noted, there was found U.S. Pat. No. 1,537,749 to COLGROVE as issued May 12, 1925 and showing alternate gripping means and alternate actuation of levers. The Pitman arm motion of COLGROVE does not produce a constant speed. Alternate gripping is shown in U.S. Pat. No. 2,107,607 as issued to GOBEL on Feb. 8, 1938. U.S. Pat. No. 3,403,831 to LAWSON, Jr., et al as issued Oct. 1, 1968 shows a gripping device with a Pitman arm drive and timed gripping. U.S. Pat. No. 3,583,268 to SCRIBNER as issued June 8, 1971 shows two gripping head systems but the drive system does not provide the constant velocity of the present invention. U.S. Pat. No. 3,844,152 to PEYTAVIN as issued Oct. 29, 1974 also shows a Pitman drive and gripping means but the film advance mechanism of this patent is produced by cam means and adjustment of the length of delivered film is not shown. The present invention utilizing an oblong path of the roller chain and a reciprocated frame therewith produces a determined overlap of gripper actuation so that the film is advanced with a positive and sequential gripping.

The packaging of small items and/or the forming of pouches is substantially dependent on the constant advancement of the film web or webs. Blister packages in which small items such as pills or the like are deposited and sealed in formed packets of film are well known. These items may be individually packaged or may be used with a lamination or foil and/or the like particularly where sealing is required and desired. The carriers of the grippers usually also carry the work stations for shaping and sealing the film or films. Conventionally the film or films are shaped into receiving pockets and a product placed therein after which the product is sealed by heat or an application of adhesive. Usually in performing the operations of making a package and the final sealing there are several successive work stations in which one or more sheets are fed. Usually this web is in roll form and is advanced by a continuous moving means.

The prior art shows squeeze rollers rotated by variable speed motors which are often deficient as to accuracy and speed. Slipage and/or skewing of the web may also occur. The invention to be hereinafter more fully described grips the traveling web of film and advances it forwardly at a determined constant velocity. A change of pivot support for the vertical levers advances the film with a more-or-less distance and a mark or indicating means may be placed on the web and this adjustment used to bring the web into coincidence. The crank arms are lengthened or shortened to change the overlap of the grippers on the advancing film.

In the apparatus to be hereinafter more fully described, the roller chain travels in an oblong manner to move connected drag links at a determined rate. These drag links are moved by the roller chain, each of which are moved by a sprocket to provide the constant velocity and continuous motion. The roller chain assemblies are carried on and by a movable frame which is moved by crank arms with a predictable overlap. The pivoted lever arms have their pivot shifted to lengthen or shorten the advancement of the film. The apparatus of this invention provides an inexpensive and adjustable means for advancing, in a constant velocity and continuous motion, one or more webs of film.

2. Summary of the Invention

This invention may be summarized, at least in part, with reference to its objects. It is an object of this invention to provide, and it does provide, an apparatus producing a continuous motion and with a constant velocity for advancing a web of film. The advance of this film employs two gripper means, preferably one on each side of the advanced web and with the gripping actuation occurring only during a forward motion. The sliding arm on the distal end carries the actuated gripper and the Pitman arm moves an endless chain apparatus frame so that at one extent of travel the gripping end is moved forwardly with a combined actuation and when released is returned at a greater speed. Two such apparatus are employed to provide this complete and continuous advancement of the web.

It is a further object of this invention to provide, and it does provide, a film advancing apparatus in which the grippers are each carried by sliding members moved by crank arms and connected Pitman arms which move a frame on which is carried an endless roller chain drive disposed in an oblong array. The chain is moved by a driven sprocket and the chain is operatively connected to an arm which moves the gripper means.

It is still a further object of this invention to provide, and it does provide, apparatus that includes automatically actuated gripper devices that are disposed on opposite sides of the traveling web. These grippers are alternately actuated to engage and release the web of film and during the engaging time cycle the grippers are moved forward and retracted in response to lever arm movement created by drag links moved by roller chain assemblies disposed and traveling in an oblong continuous path. These chains are driven by sprockets which are driven by motor means. The roller chain is carried by a frame that is cycled back and forth by a pitman arm driven or moved by a crank arm. The crank arm throw is made more-or-less so that the movement of the Pitman arm increases or decreases the overlap in the gripper actuation. The crank arms, the Pitman arms, the roller chain assemblies, the cycled frames, the drag links, the lever arms and the sliding arms with their gripper means are at least two in number with the pivot support of the lever arms changed to increase or decrease the advance of the film web produced with each and every forward stroke of the sliding arm. The lever arms and the roller chain drives are two in number and are cycled alternately by a crank arm having a selected throw that is increased or decreased as desired to control the advance of the film web.

In brief, this apparatus providing the continuous motion and constant velocity to a web and/or web of film includes a motor means that powers a driven shaft secured in place as far as the machine is concerned. This driven shaft carries and rotates two sprockets that are positioned and disposed to drive two roller chain assemblies in an endless oblong path. The two roller chain assemblies are one hundred eighty degrees out-of-phase with each other. These roller chain assemblies each are operatively connected to a drag link member. This roller chain assembly is carried on a frame that is slidably mounted to be cycled back and forth by a crank arm connected to a Pitman arm that is pivotally connected to the cycled frame.

In the preferred embodiment there are two roller chains for each cycled frame making a total of four roller chains and two frames. The crank arms driving these frames are depicted as having adjusting means or slots for increasing or decreasing the throw of said arms. These slots are shown for increasing or decreasing the movement of the Pitman arm and the frame for the chain which merely decreases or increases the amount of overlap of the gripper on the film. There is additionally provided means for changing the positioning of the web so the web can be exactly matched with an indicator spot on the web. The pivot for the lever arms is shifted to increase or decrease the advancement of the web. The movable frame carrying the roller chain drive and the chains thereon in an oblong path provides a lengthened advancing stroke with the forward motion of the roller chain frame and a diminished return stroke with the return of the chain and frame. The overlap provided as the drag link is moved by the oblong chain and the Pitman arms is increased or decreased according to the desires of the particular operation being performed. An increase or decrease in the diameter of the supporting rollers of the oblong chain is also a factor in determining the overlap of the grippers. What is provided in this apparatus is a long forward stroke of the upper extent of the chain and forward movement of the frame and a foreshortened return stroke utilizing the arcuate travel of the chain around the pulleys and the return extent of the chain. The movement of the chain frame by the Pitman arm provides such an overlapping motion so the forward movement of the chain provides more than one-half of the roller chain extent on the forward stroke and the return stroke is equivalent to less than one-half of the roller chain extent.

In addition to the above summary the following disclosure is detailed in insure adequacy and aid in understanding of the invention. This disclosure, however, is not intended to cover each new inventive concept no matter how it may later be disguised by variations in form or additions of further improvements. For this reason there has been chosen a specific embodiment of continuous motion, constant velocity, film advancing apparatus as adopted for use with film webs and packaging by said films and showing a preferred means for constructing and utilizing said apparatus.

This specific embodiment has been chosen for the purposes of illustration and description as shown in the accompanying drawings wherein:

BRIEF DESCRIPTION OF THE DRAWINGS

FIG. 6 represents an exploded isometric view showing a typical yoke assembly as used in the apparatus of FIGS. 3, 4 and 5;

FIG. 7 represents a face view of the fragmentary and diagrammatic apparatus and showing the drive apparatus and control for a position adjustment of the web feeding apparatus, this control being mounted and forming a part of the vertical members used with and on the end of the pairs of lever arms;

FIG. 8 represents a fragmentary and diagrammatic side view of a length and motion control means in which the pivot support for the vertical arms is moved to change the grip on the advancing film, this view taken on the line 8—8 of FIG. 7 and looking in the direction of the arrows;

FIG. 9 represents a side view, partly diagrammatic and fragmentary of the apparatus of FIG. 7 and showing in particular the adjusting means of shifting the pivot of the vertical arm, this view taken on the line 9—9 of FIG. 7 and looking in the direction of the arrows;

FIG. 10A represents a side view, partly fragmentary and diagrammatic and showing the vertical arms of FIG. 7 with the pivot shifted from coincidence;

FIG. 10B represents the side view of FIG. 10A with the pivot point in coincidence with the short arm pivot;

FIG. 11A represents an isometric view, partly diagrammatic and showing the grippers arranged to advance the web forwardly, these gripper frames actuated by vertical link arms and showing a desired array wherein two grippers are carried on an upper frame and grasp the film web while two other grippers carried on another and lower frame release the web and return to the initial start of the stroke, the forward stroke travel of the frames and grippers are used to carry the film web forwardly and an overlap is provided whereby the other pair of grippers grasp the film web and carry it forwardly as the first pair of grippers are released and return;

FIG. 11B represents a very fragmentary side view in a slightly enlarged scale and showing a roller support providing for the movement of the frames by the mechanism of this invention;

FIG. 11C represents a very fragmentary and transverse view of the roller support for a pair of channel members as shown in FIG. 11B;

In the following description and in the claims various details are identified by specific names for convenience. These names are intended to be generic in their application. Corresponding reference characters refer to like members throughout the several figures of the drawings.

The drawings accompanying, and forming part of, this specification disclose details of construction for the purpose of explanation but structural details may be modified without departure from the concept and principles of the invention and the invention may be incorporated in other structural forms than shown.

DESCRIPTION OF THE PREFERRED EMBODIMENT

Figure 1:
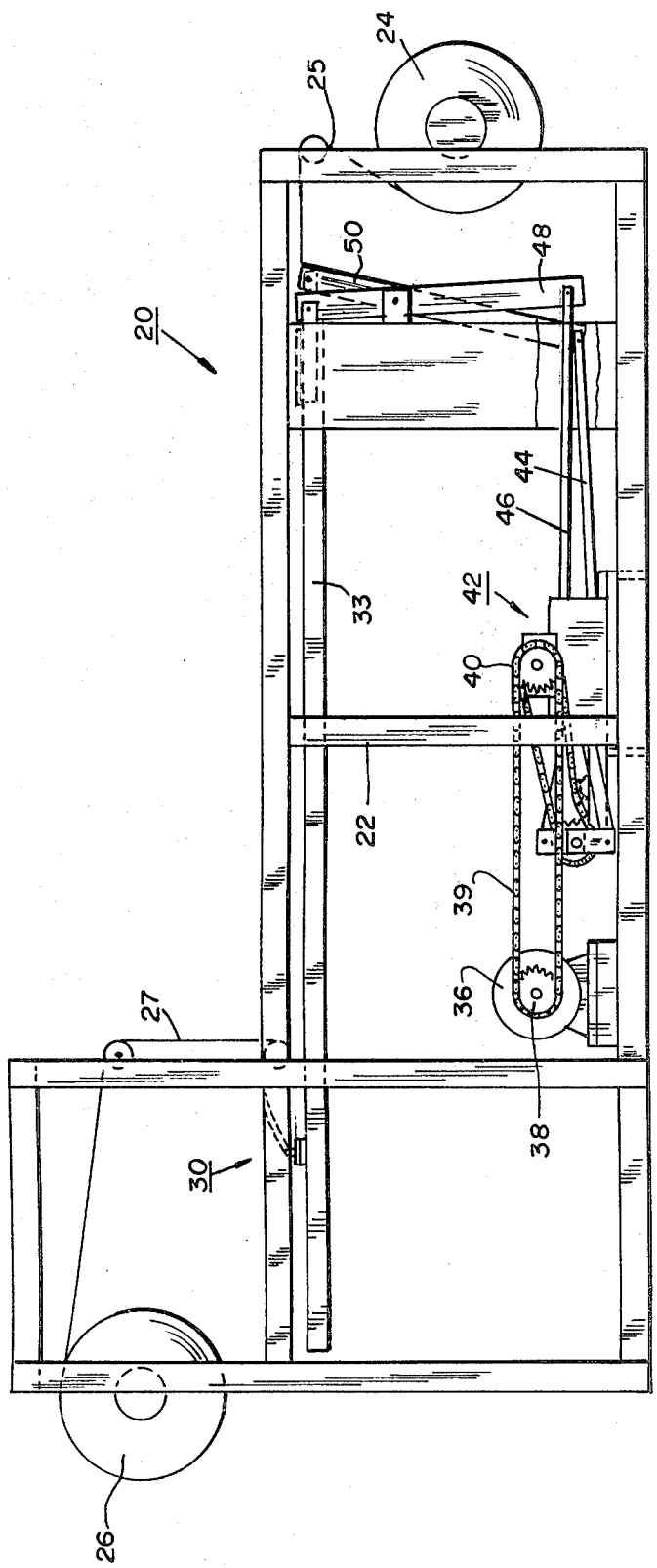
FIG. 1 represents a side view, partly diagrammatic and fragmentary of the apparatus of this invention and showing the preferred arrangement of the several components employed in this apparatus.

Referring next to the drawings and the apparatus shown there is provided a preferred embodiment for a continuous motion and constant velocity mechanism for one or more film webs. In FIG. 1 two webs of film are represented but more or less may be used in and with this apparatus. Two gripping and releasing system heads are used and these are alternately actuated, preferably with one gripper along each side or edge portion of the web or film strip being advanced. A frame 20 is depicted as carrying a reciprocated member by and in between posts 22 which are shown as plural vertical members. A bottom roll of film 24 is carried by the frame and as this film is unwound it provides a lower strip 25 which is brought to the film advancing system. At a later station a top roll of film 26 is aligned and delivers a top strip 27. The upper, lower and/or both film webs may be formed or sealed by means well known in the trade and are not described as this apparatus is directed only to a continuous motion at a constant velocity.

Figure 2:
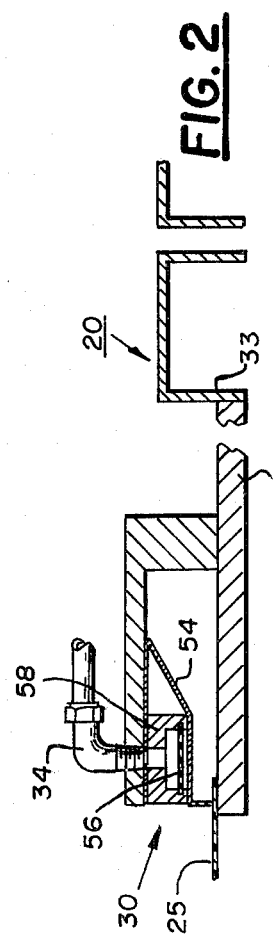
FIG. 2 represents a fragmentary sectional view in an enlarged scale and showing a gripping device which is pneumatically actuated to grasp the web at determined periods of time and advance said web.

In FIG. 2 is shown a gripper 30 in an enlarged scale and representative of a gripper device that may be used with a reciprocated member. As shown, a member 32 is reciprocated back and forth as carried by and with a U-shaped channel member. This gripper is shown as actuated by pressurized air fed through a conduit 34. If and when the lower web or strip 25 is formed and advanced for containing and packaging small articles said forming is prior to the final seal or attachment to a card strip, film and/or the like such as vac-forming or skin packaging. Although pneumatic gripping means is shown in FIG. 2, this does not preclude other gripping apparatus or means such as a solenoid. Economics and availability are the controlling factors in the selection of the apparatus providing the sequential gripping and advancement of the traveling web. A gripper arrangement utilizing two reciprocated frames and four grippers is hereinafter described in FIGS. 11A, 11B and 11C.

Referring again to FIG. 1, there is shown in the mechanism an electric motor 36 which carries on its output shaft a pulley or sheave 38 which drives a belt or chain 39 which in turn drives an outboard sheave or sprocket 40. This belt or chain 39 and driven sprocket or sheave 40 is more fully shown in FIGS. 3, 4 and 5. The film advance mechanism as shown is carried above the lower portion of the frame 20. This apparatus is generally identified as 42 and is powered and moved by motor 36. This motor means may be hydraulic or pneumatic as long as the desired speed and power is supplied. The output of the advancing mechanism 42 is transmitted to two drag links 44 and 46 which are pivotally connected at their right ends to vertical arm members 48 and 50 more fully described in FIGS. 7, 8, 9 and 10. These vertical arm members move the reciprocating members, of which 32 is a typical reciprocated member and is used with a transverse support 33 with the grippers 30. The actuated frames and the associated grippers are cycled in connection with the apparatus of FIGS. 3, 4 and 5. The gripper support and actuated assembly is shown in FIGS. 11A, 11B and 11C to be hereinafter more fully described.

The gripper mechanism shown diagrammatically and as representative of a typical gripper mechanism is shown in FIG. 2 with the reciprocated members 32 and 33 supported by frame 20. The grippers 30 include a metal end support 54 which is moved by a diaphragm 56 carried in a block 58. Other gripper means may be provided and no patentable distinction is ascribed to this device since gripping means is well known.

ADVANCING MECHANISM OF FIGS. 3, 4, 5 AND 6

Figure 3:
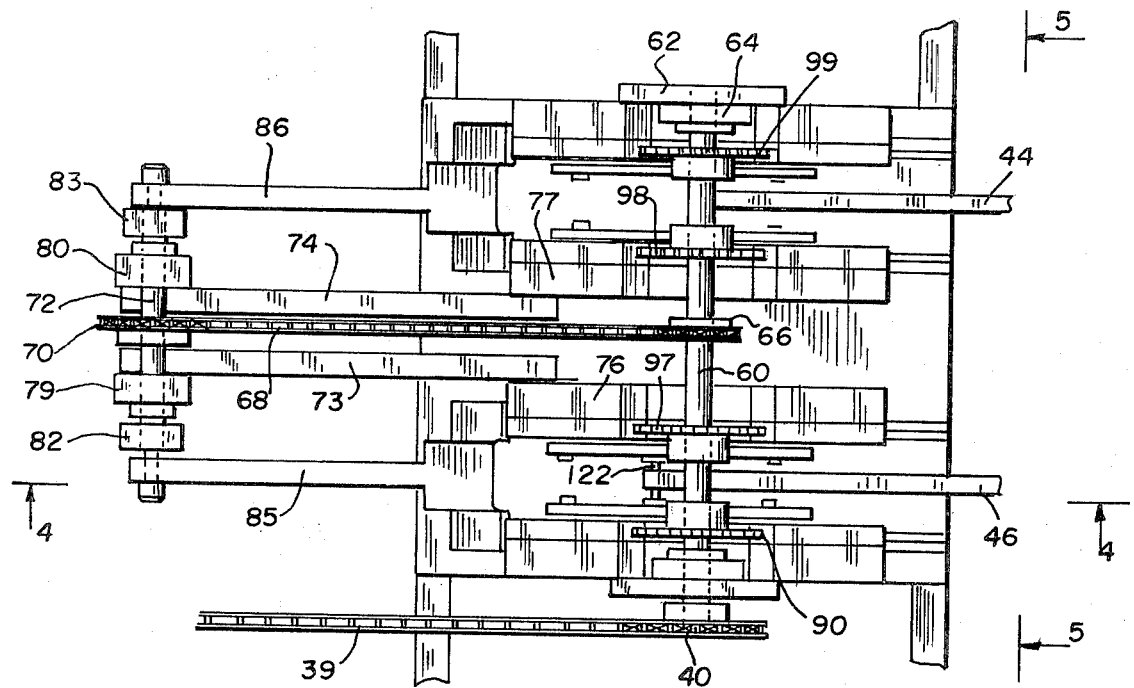
FIG. 3 represents a plan view, partly diagrammatic and in an enlarged scale from the view of FIG. 1 and showing the drive mechanism for alternately moving the Pitman arms.

In the drawings there is depicted the preferred apparatus or mechanism to positively and economically provide the continuous motion and constant velocity of the film web advancement. As seen in FIG. 3, the drive from motor 36 (FIG. 1) is by a roller chain, timing belt or V-belt 39. The showing is a roller chain which moves a sprocket 40 carried by and on the end of a shaft 60. This shaft is carried by support members 62 and antifriction bearings 64 secured to these support members. As seen particularly in FIGS. 3 and 4, this shaft 60 carries midlength thereof another sprocket 66 which engages and drives a roller chain 68. This traveling chain engages and rotates a driven sprocket 70 carried on and driving a short shaft 72. This shaft is carried by leftwardly extending portions 73 and 74 of inner support members 76 and 77. As seen in FIG. 3, this shaft 72 is carried by two support blocks 79 and 80 which include anti-friction bearing means.

Figure 4:
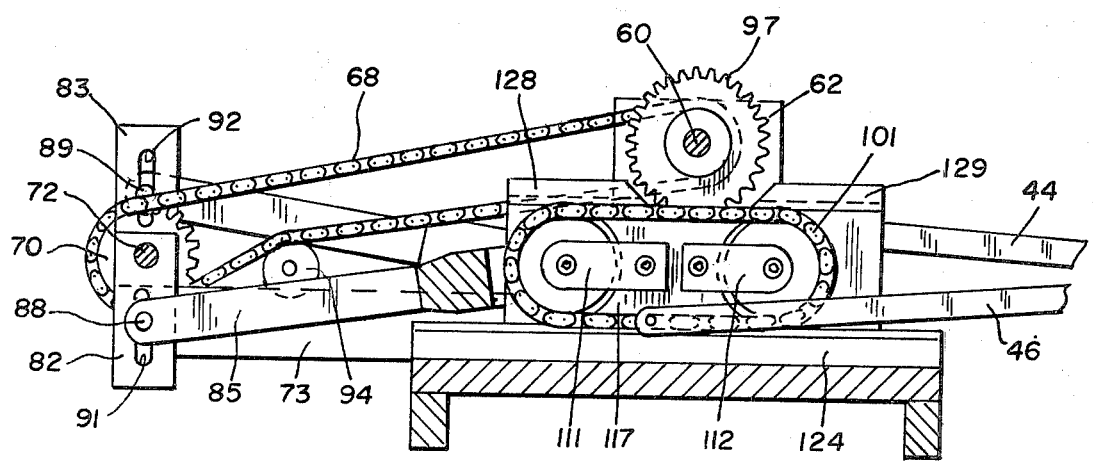
FIG. 4 represents a side view, partly diagrammatic and showing the apparatus of FIG. 3, this view taken on the line 4—4 thereof and looking in the direction of the arrows.

On this shaft 72 are mounted two slotted crank arms 82 and 83 disposed at one hundred eighty degrees from each other. Carried and moved by these arms 82 and 83 are Pitman arm members 85 and 86. Pivot pins 88 and 89 retain the left end of these arms. Slots 91 and 92 are shown and adjustment in the crank arm throw by these slots change the overlap of the gripper. The right ends of the Pitman arm members are forked so as to carry two roller chain assemblies to be hereinafter described in detail with reference to FIG. 6. The sprocket 66 drives and moves the chain 68 which is kept at the desired taughtness by means of the tightener and adjusting idler 94 as seen in FIG. 4.

Figure 5:
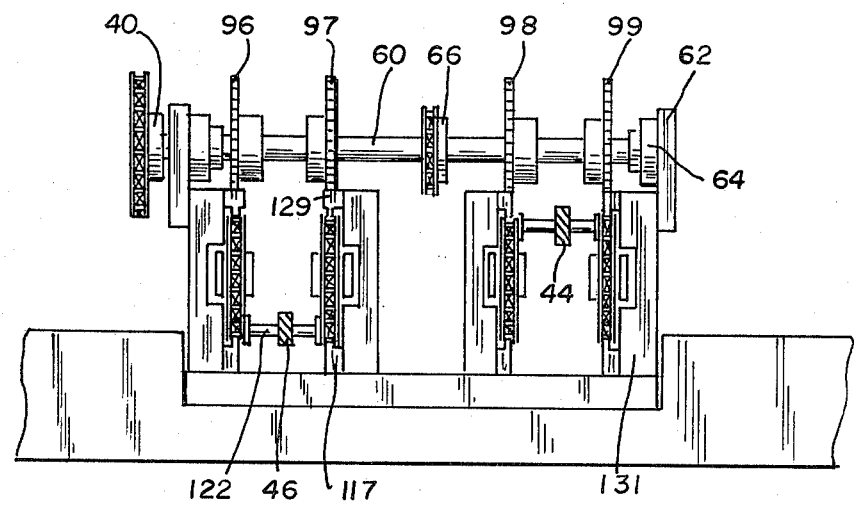
FIG. 5 represents a sectional and plan view of the apparatus of FIG. 3, this view partly diagrammatic to show the relationship of the several components in the advancing mechanism, this view taken on the line 5—5 of FIG. 3 and looking in the direction of the arrows.
Figure 12E:
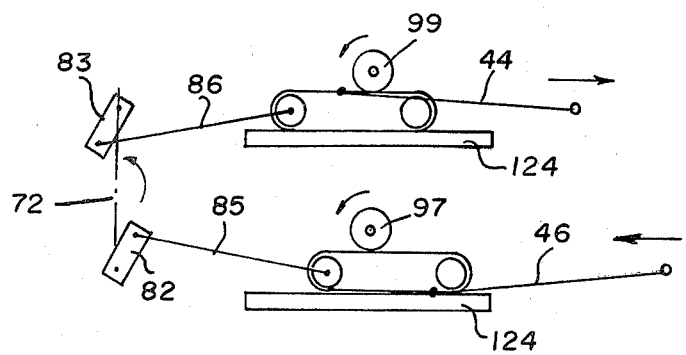
FIGS. 12A, 12B, 12C, 12D, 12E and 12F represent diagrammatic stages of the actuation of the feed mechanism with the showings at sixty degrees advance to show the motion of the apparatus for producing a constant velocity and continuous motion web or film feeding system with a mechanical and inexpensive assembly of components.
Figure 12F:
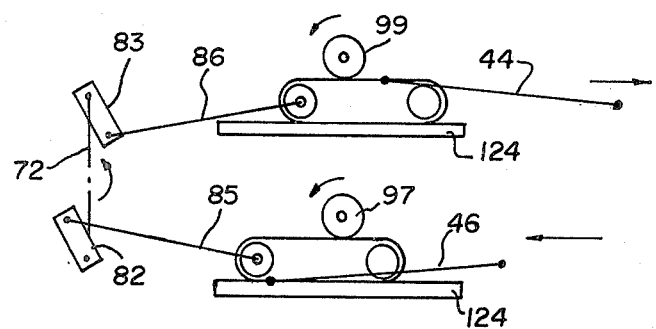
Figure 12A:
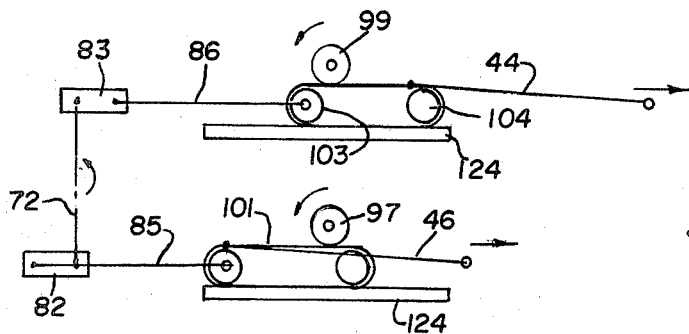
Figure 12B:
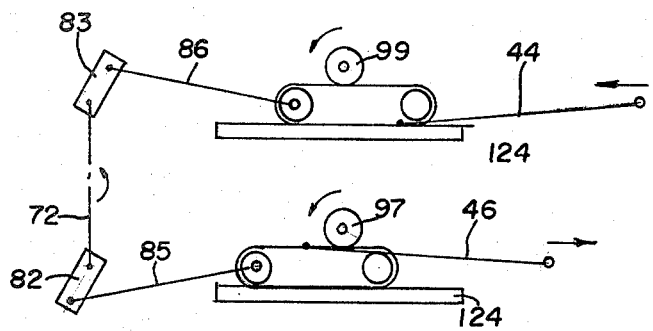
Figure 12C:
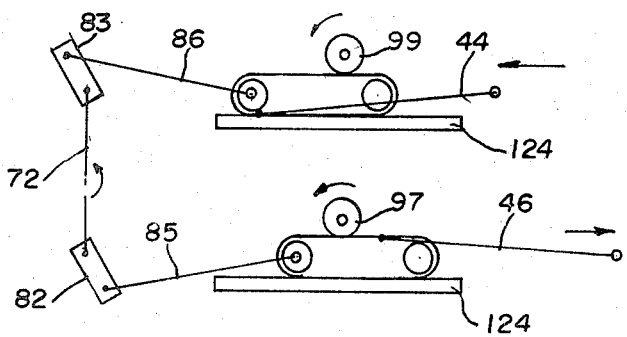
Figure 12D:
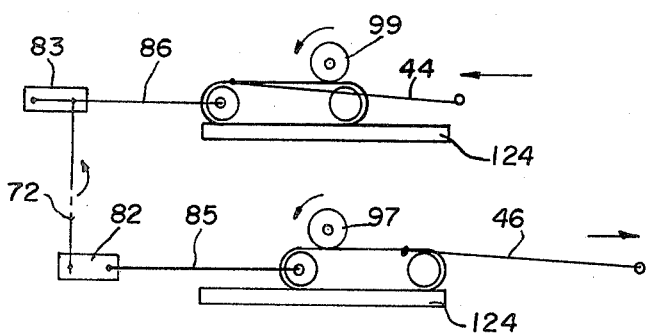

Referring to FIG. 6, the roller chain drives that move drag links 44 and 46 are depicted as four oblong roller chain assemblies arranged as dual pairs. Assuming that the far forked arm is Pitman arm 86, this arm moves the dual roller chain drive in a reciprocating motion and with cyclodial velocity. The forked end of this arm as seen in FIGS. 3 and 5 carries two substantially identical roller chain assemblies arranged to be moved in continuous motion and speed by engaging drive sprockets. Sprockets 96, 97, 98 and 99 are carried and driven by the shaft 60. In FIG. 6 sprocket 99 drives the roller chain 101 as carried by two smooth disks 103 and 104. These disks are carried on threaded and headed shafts 106 and 107. Interior of these disks and securing outer plate members 109, 110, 111 and 112 are cap screws 114 and 115. interior spacer plate 117 has spaped and cutout ends to accept the outer diameter of disks 103 and 104. Slots 119 and 120 permit an adjustment of the disks to be made and bring the roller chain 101 to a taut condition.

Also carried by this roller chain as one of the connecting pins or an attached component is a connecting shaft 122 that is shown with a collar 123 to establish the positioning of shaft 122 between the chains as in FIGS. 3 and 5. The drag link 44 is reciprocably moved by both the motion of the forked arm 86 and the oblong path of the moving roller chain 101. In FIG. 6 the sprocket 99 is shown and in FIG. 4 this sprocket is shown as engaging and advancing the roller chain 101 at a selected constant speed. The drag link 44 may be secured to the shaft 122 by a pin or set screw not shown or the link 44 may be rotatably mounted on shaft 122 and retained in position by snap rings and/or the like. The positioning and retention is merely a matter of preference. As shown in FIGS. 3 and 5 the preferred or depicted apparatus has four roller chain drives like FIG. 6. Each roller chain is moved by a sprocket on shaft 60. The forked arms each carry two roller chain drives as seen in FIGS. 3 and 5.

As seen in FIGS. 5 and 6, the movement of the roller chain drives is a slide on guides. A lower slide bar 124 engages the rollers of the roller chain 101 as it is moved in the oblong path by the sprocket 99 and also cycled back and forth by the Pitman or forked arm 86. The roller chain is engaged and retained by and on its rollers by upper slide bars 128 and 129 which are made as two portions and when mounted provide a V-shaped opening midway of the roller chain extents for the entry of the teeth of the sprocket 99. The showing of FIG. 4 depicts the arrangement of parts and the spacer plate 117 provides on its upper extent a support of the roller chain 101 as it is moved by the sprocket 99. Outer member 131 is grooved at 132 to provide clearance for the reciprocal movement of the plates 109 and 110. As seen in FIG. 5 there is a like outer member 134 arranged in a mirror disposition.

As seen in FIGS. 3 and 5, the apparatus of FIG. 6 is repeated in a very like or similar manner to provide a like mechanism but cycled at one hundred eighty degrees out-of-phase with the shown mechanism. Thus, the apparatus shown employs four sprockets 96, 97, 98 and 99 driving four substantially identical roller chains 101. Two of these chain assemblies are moved by forked arm 85 and two by arm 86. The pair of chains moved by arm 85 are operatively connected to shaft 122 and to drag link 44. A like mechanism as moved by Pitman arm 86 results in the movement of link 46. The alternate gripping and continual advancement at and with a constant velocity is shown and described in FIGS. 12 A, 12 B, 12 C, 12 D, and 12 E.

FILM ADJUSTMENT OF FIGS. 7 THROUGH 10 B

In FIGS. 7, 8, 9, 10 A and 10 B there is depicted apparatus that may be either automatic or manually controlled to advance or retard the film a determined amount. The preferred apparatus may be actuated in response to an index mark formed on the web of film or other means or may be adjusted in its advance to bring a forming and/or a sealing process into coincidence. In the apparatus shown in FIG. 1, the vertical arms 48 and 50 are pivoted to provide a fixed ratio. In the embodiment shown in FIGS. 7, 8, 9, 10 A and 10 B, the pivot point or position may be in coincidence and is moved from this coincidence point to increase or decrease the throw and movement of the film with each stroke. This shift in pivot axis permits adjustment when and while the apparatus is in operation and does not require a shut down of the apparatus to adjust the delivery stroke of the grippers and connected arms.

As shown, arms 148 and 150 are full length and at their lower ends are pivotally connected to links 44 and 46. At their upper ends the arms 148 and 150 are pivotally connected to and move the member 32 shown in FIG. 2 and a like member disposed at the other side of the traveling web of film. Support bracket ear portions 160 and 162 extend from supports 163 and 164. Support 163 is seen in FIG. 1 and extends from the top to the bottom of the frame 20. Other support means may be provided but the supporting and positioning of the fixed pivot axis is adapted to carry pivot pins or cap screws 165 and 166. The lower ends of these arms are pivotally connected to links 44 and 46 by pivot pins 172 and 173. Carried on the frame 20 is a support frame 175 that includes a fixed support means for two rods 177 and 178. These rods retain a movable pivot block 180 moved by a lead screw 182 having its lower end retained by a bearing in the support frame 175 and having its upper end extending through bearing means to retain and be turned by a roller chain sprocket 184. This sprocket may be driven by a roller chain 186 actuated by a reversing motor not shown.

As block 180 is moved up and down by the turning of the lead screw 182, pivot slide blocks 188 and 190 are moved on rods 192 and 194. These rods are secured in retainers 196, 197, 198 and 199 on lever arms 148 and 150. This pivot axis is shifted either during operation or at rest with the shift indicated in FIGS. 10 A and 10 B. In FIG. 10 A the pivot axis is shown as moved upwardly whereat the lever arm movement and the grippers attached decreases the movement of the advancing film which is less than if the pivot had been in coincidence as in FIG. 10 B. The shifting or movement of the pivot point below the theoretical pivot axis of the pivot axis 200 of the screws 165 and 166 increases the movement of the web.

GRIPPER MOVING FRAMES OF FIGS 11 A, 11 B and 11 C

The drawing of FIGS. 11 A, 11 B, 11 C show a preferred embodiment for advancing the web of film as by four gripper heads 30 as shown diagrammatically in FIG. 2. For the purpose of identification an inner movable frame as cycled by vertical arm 50 is pivotally connected to arm member 210. This member is attached to a transverse support 212 which is secured to and carries extensions 214 and 215. Each extension is pivotally secured to a longitudinally disposed channel member 217 and 218. At a determined distance from the right end support 212 is a transverse member 200 which not only retains the channel members 217 and 218 in a fixed array but also retains two grippers 30 (web clamps) as shown in FIG. 2. It is to be noted that the grippers 30 are arranged as mirror images of each other so that the gripping area is disposed to engage the web of film 25.

In a like manner the vertical arm 48 moves an outer frame that is one hundred eighty degrees out-of-phase with the inner frame. Arm 48 is cycled to move arm member 230 secured to transverse support 232 which is secured to and carries extension members 234 and 235. Each extension member is pivotally secured to channel members 237 and 238. At a determined distance from the right end support 232 is another transverse member 240. This transverse member is shown to the left of support 220 and is secured to only the outer channel members 237 and 238. A pair of grippers 30 are secured and carried by member 240 and are spaced to grasp the traveling web 25 when actuated. In FIG. 11 A member 50 is shown connected to the outer frame but 48 or 50 may be secured to either frame and this is a matter of choice.

The adjustable pivot for the vertical links is shown and described in connection with FIGS. 7 through 10 B. The showing of this FIG. 11 A is merely as an explanation of the desired apparatus. The movement of the arms 210 and 230 are cycled back and forth as established by the drag links 44 and 46. A determined overlap of the grippers on the traveling web insures that this web will always be grasped during the desired forward travel. The extent of overlap is established by the throw of the crank arms 82 and 83 (FIGS. 3, 4 and 5) and the size of the disks 103 and 104.

In FIGS. 11 B and 11 C is shown a very fragmentary view of a reduced-to-practice means for carrying the channel members 217 and 218 and also 237 and 238 with the minimum amount of effort. As shown these channel members are carred as a spaced pair on a channel support member 250. Two support channels 250 are utilized, each supporting side-by-side channel members such as 217, 218 or the pair 237 and 238. Each upwardly directed leg of support member 250 is provided with a cutout 252 which may be a lengthened contour cut or may be a straight vertical cut made by an end mill or die with an arcuate or radial lower receiving cup. This cutout is disposed to receive an axle member 254 on which two rollers 256 and 257 are secured. These rollers are disposed on each side of an upwardly extending leg and as seen in FIG. 11 C supports a channel member. Where the rollers are not free-turning on the axle member 254 the elongated slot or cutout 252 is used so that the rollers may travel with the associated channel member. Where the rollers have bearing means and are free-turning on the axle the cutout may be only a verticl slot or may be a punched or drilled hole. The reciprocated channel members are supported by the rollers and do not engage the support channel 250.

The film transport apparatus shown in FIGS. 11 A, 11 B and 11 C anticipate that the desired work stations will be carried on the cycled frames. The work station such as form, fill and seal may be located on either the inner or outer rail pairs and are programmed to be operated by control means not shown only when that rail pair is advancing along with the film. The securing of the work station and the associated hardware is dependent upon the work to be performed and is a matter of selection by the user of the equipment.

DIAGRAMMATIC REPRESENTATIONS OF FIGS. 12 A THROUGH 12 F

Referring next and finally to the diagrammatic representations of FIGS. 12 A through 12 F, the alternate advancement of the web at a constant velocity and with continuous motion is shown in a step-by-step explanation.

In FIG. 12 A the near crank arm 82 moves the forked arm 85 with and in a cycloidal actuation. The drag link 46 as carried by the shaft 122 is moved by the sprocket 96 to advance the gripper 30 and the web forwardly. This showing has the drag link 46 and its connection to the roller chain 101 at the left upper extent. The connection of the chain 101 to the drag link 46 is at the upper left and just after the travel of the connector around the left half of disk 103. It is to be noted that although crank arms 82 and 83 and their connected Pitman arms 85 and 85 exactly one hundred eighty degrees out-of-phase a near drag link 46 is just beginning its forward movement and the drag link 44 is still advanced forwardly so that the traveling grippers engage the web of film and advance it forwardly at the same rate.

FIG. 12 B shows the diagrammatic showing of FIG. 12 A but with the shaft 72 and the crank arms 82 and 83 moved sixty degrees from the position of FIG. 12 A. The arrow indicates that shaft 72 has been rotated counterclockwise. Crank arm 82 has moved forked arm 85 rightwardly and at the same time sprocket 96 (FIG. 3) has moved roller chain 101 forwardly. The resulting motion of the drag link 46 and the attached grippers 30 actuated by this drag link has advanced the film or web forwardly as indicated. At the same time the crank arm 83 and the attached Pitman arm 86 moves the drag link 44 leftwardly after the connecting end of the drag link has been moved by the roller chain around the disk and onto the lower extent. The rotational movement of the roller chain of this sprocket 97 has insured constant velocity and motion of the film. When the lever arms and the grippers have reached their forward extent the grippers are released so that a return stroke of the drag link can be made. It is also to be noted that the frame of the far oblong chain drive is being moved to the rear or to the left by the crank arm 83.

FIG. 12 C shows or indicates the apparatus with the crank arms 82 and 83 and shaft 72 advanced one hundred twenty degrees from the position of FIG. 12 A. The near drag link 46 is still being moved forwardly by the forked arm 85 and the sprocket 96 is advancing the roller chain 101. The gripper on the advancing apparatus still engages the film web while the grippers on the other apparatus actuated and moved by the drag link 44 are disengaged.

The forward moving arm of the drag link 46 is still on the upper extent of the near oblong chain and the Pitman arm 85 is moving the frame forwardly to advance the film web with a constant speed and velocity. It is to be noted that the drag link 44 is now moved almost to the rear and left of the lower extent of the chain and is about to proceed around the rear pulley. This frame has been moved by the Pitman arm 86 and the crank arm 83 to the rear. In the meanwhile the rear drag link 44 is shown as having travelled around the rear of the disk 103 and is again on the upper extent of the chain and the gripper is now or is ready to be actuated. The drag link 44 advanced the film web with its forward movement. It is to be noted that this overlap of the grippers is the same as in FIG. 12 A but the chains and the drag links are now reversed to indicate the one hundred eighty degrees out-of-phase movement of the drag links around the oblong travel of the chains. It is also to be noted that the desired overlap is indicated by this step.

FIG. 12 D represents or shows the apparatus of FIG. 12 A advanced one hundred eighty degrees. Crank arms 82 and 83 and the rotating shaft 72 have been likewise moved. The near drag link is shown further forwardly (rightward) than in the sequence of FIG. 12 B and the gripper or grippers 30 still engage the traveling web 25 to move this web but are about to be released. The drag link 46 is approaching the forward disk 104 and at this point the gripper actuation will terminate. The frame carrying the oblong extent of roller chain 101 is at its forward maximum (rightward) travel extent. The rear apparatus moved by crank arm 83 and Pitman arm 86 has moved the slide bar 124 to the rearmost extent. The drag link 44 has moved around the rear disk 103 and is on the upper extent of travel and the gripper or grippers 30 are actuated to grasp the film and move it forwardly. The drag links 44 and 46 are both moving forwardly and overlap of gripper grasp is now possible and probable. This is similar to FIG. 12 A but with one hundred eighty degree out-of-phase motion.

FIG. 12 E represents or shows the movement of the apparatus now advanced two hundred and forty degrees. This showing is very like the disposition in FIG. 12 B but with the near and far chains and associated apparatus one hundred eighty degrees out-of-phase. Crank arms 82 and 83 as well as shaft 72 have been rotated another sixty degrees from the station of FIG. 12 D above. Drag link 46 has moved around forward disk 104 and is now on the return stroke and under extent of the chain. The Pitman arm 85 is moving leftward the frame carrying the roller chain. The gripper or grippers 30 associated with drag link 46 is deactivated and do not grasp the web of film. Pitman arm 86 is moving the frame and chain forwardly. The drag link 44 is moving forwardly at a speed regulated or governed by sprocket 99. The gripper or grippers associated with drag link 44 is in engagement with the web of film.

FIG. 12 F depicts the movement of the drag links 44 and 46 as moved by the Pitman arms 85 and 86. The comments and description of this advancing apparatus is the same as the FIG. 12 C but with everything one hundred eighty degrees out-of-phase. It is to be particularly noted that the Pitman arm 85 has brought the drag link 46 to the rear of this apparatus ready to go around the rear pulley 103 and while this is going on the drag link 44, as advanced by the sprocket 99, is also moving forwardly under the influence of the sprocket and the crank arm.

The disks 103 and 104 and chain 101 carried thereon are, of course, utilized in all drives shown in the several FIGS. 12 A through 12 E but for ease of depiction is only indicated in FIG. 12 A. It is realized that the above described apparatus may be modified to accommodate specific concepts. The grippers shown in FIGS. 11 A, 11 B and 11 C are conventionally mounted on opposite sides or edges of the web. This does not preclude positioning or placing of the grippers at some place near the middle or both on the same edge. What is important is that each gripper be moved in response to the action of the roller chain as it transverses an oblong path. It is also to be noted that the vertical arms 48 and 50 and their pivotal support may be substituted for or changed as for example by a belt and springs. The apparatus depicted provides a simple, inexpensive assembly that has been reduced to practice and has proved to be easily manufactured and adjusted. The overlap of the two chain systems as provided by the movement of the drag links 44 and 46 provides the desired gripping and release and the desired advance and transfer from one set of grippers to the other set of grippers without loss of motion or velocity. A predetermination of the length of crank arms in relation to the diameter of disks provides the desired amount of overlap of the grippers in the final operation.

The concept of the above described apparatus utilizes the continuous motion and advancement of the roller chain assemblies in which roller chains 101 are moved as by sprockets 99. These sprockets are of a like size and pitch and move the engaged roller chain at a determined speed (i.e. velocity). The cycling of the frame carrying the disks 103 and 104 cause the chain frame to be moved forwardly or rearwardly but the rate of travel of the roller chain 101 is established by the revolutions of the sprocket. In its forward movement the chain 101 not only employs the extent of the top travel but also the forward movement of the frame, hence the number of pitches in the roller chain plus the number of pitches equivalent to the forward travel of the chain frame are utilized to provide the total forward travel. The return of the chain frame as controlled by the crank arm and Pitman arm is equal to the number of pitches of chain minus the rearward travel of the chain frame. As seen in FIG. 4 and the diagrammatic showing of FIGS. 12 A through 12 F the desired advancement and overlap is shown.

The shifting of the pivot of FIGS. 7 through 11 changes the pivot pin position and the throw ratio establishes the determined advance of the web. Each actuation or advancement of the web is equal to the ratio in the vertical arms and the movement of the drag link. The speed of travel is increased or decreased momentarily but the resulting motion of the traveling web is only increased or decreased sufficiently to bring the travel of the web into the desired coincidence. The apparatus shown particularly in FIG. 4 has straight extent of the roller chain and the size of the disks 103 and 104 are proportioned so that the forward travel of the chain and frame moves the drag links 44 or 46 in a lengthened travel motion and in a straight line. The actuation of the grippers are timed to this straight line motion. The return actuation and deactivation of the grippers include the arc motions around both disks and the return strokes along the straight extent. The gripper actuation occurs only with a straight forward travel and the return deactivation includes the other portion including the arc travel around the disks. This apparatus provides an overlap of grippers to insure that the traveling web is advanced at all times. The number of pitches on the straight extent plus forward travel of the movable frame is made more than the circumference of a disk plus the straight extent less the travel of the frame.

The above described apparatus is shown as having the oblong path of the roller chain adapted to move the drag link 44 or 46 forwardly on the upper extent of the roller chain but the apparatus may be operated by a reversal of the rotation. It is only important that in its forward movement the oblong roller chain path also include the forward movement of the supporting frame as moved by the crank arms (either 82 or 83). The return motion of the drag link is speeded up by the number of pitches of the roller chain less the travel of the roller chain frame.

The apparatus shown has four roller chain assemblies and four sprockets driving said chains. As few as two chain assemblies may be employed and more than four may be utilized. The four chains and four sprockets provide a nicely balanced apparatus and the connecting drive shafts 122 moving the arms 44 or 46 are not eccentrically loaded. A balance of the apparatus to reduce wear is desired. The apparatus shown has the roller chains 101 riding on the slides 124, 128 and 129 but other support means for the reciprocating frame for the disks 103 and 104 may be provided. Disks 103 and 104 are shown without teeth for the roller chain but sprockets can and may be used if desired.

The above apparatus indicates a novel method of constructing apparatus for advancing a web of film with a constant motion and continuous velocity, this method including the steps of providing and positioning a frame and table for the delivery and advancement of a web of material; arranging and actuating a pair of grippers disposed to alternately grasp and advance the travelling web, the grippers positioned at and on opposite sides of the travelling web; carrying each gripper on and by a reciprocated member; carrying a motor on said frame and with this motor rotating a first shaft on which is mounted at least two like roller chain sprockets secured to this shaft at a determined spacing; providing a pair of like-pitched and like-length roller chain assemblies and disposing these assemblies in an oblong endless array and carrying these chain assemblies so that the midlength is engaged and driven by one of the sprockets carried and rotated by the first shaft, said roller chain assemblies carried on two disk-like members with these disk-like members secured to a reciprocably movable frame; rotating and carrying a second shaft on said frame with two crank arms mounted on and secured to this second shaft, the crank arms moving pivotally connected Pitman arms which are also pivotally connected at their other end to the reciprocated frame carrying the oblong roller chain assembly; arranging the crank arms on the second shaft so as to move the Pitman arms one hundred eighty degrees out-of-phase with each other and with a given cycloidal motion; attaching a drag link to each roller chain assembly with a connecting pivot and arranging the attaching connection so as to travel in the oblong path of the roller chain, and operatively connecting the drag link to the reciprocated members so the one hundred eighty degrees out-of-phase movement of one lever arm is translated in a like manner to the reciprocated member and actuating the gripper associated with said member only during the forward travel of the member.

It is to be noted that in the above description the term "one hundred eighty degrees out-of-phase" pertains to the cycled frames as particularly shown in FIGS. 11 A, 11 B and 11 C but in actual practice the overlap motion of the drag links as moved by the oblong chain assemblies produces a relationship which at only two times per cycle is this designation literally true. The actuation and explanation of FIGS. 12 A through 12 F show the actual procedural relationship.

Terms such as "left", "right", "up", "down", "bottom", "top", "front", "back", "in", "out", "clockwise", "counterclockwise" and the like are applicable to the embodiment shown and described in conjunction with the drawings. These terms are merely for the purposes of description and do not necessarily apply to the position in which the continuous motion, constant velocity, web feeding apparatus may be constructed or used.

While a particular embodiment of the apparatus has been shown and described it is to be understood the invention is not limited thereto and protection is sought to the broadest extent the prior art allows.

What is claimed is:

1. Apparatus for providing continuous motion and constant velocity to a traveling web of material such as film, said apparatus including:
   (a) a frame;
   (b) a pair of gripper means adapted to alternately grip the web, each gripper means carried by a reciprocated member supported by said frame;
   (c) means to move each reciprocated member and associated gripper means so as to advance the traveling web;
   (d) motor means carried by said frame and providing sufficient power to actuate the apparatus for advancing said web;
   (e) a first shaft carried by said frame and rotated by said motor means through a connecting means, said shaft carrying and rotating at least two sprockets fixed thereto;
   (f) at least two roller chains each assembled in an endless manner and carried in an oblong path on a pair of disk-like support means, each of said disk-like support means secured to a reciprocably movable frame and means to maintain said endless roller chain assemblies in a taut condition so that each of said roller chain assemblies is driven by one of the rotating sprockets carried on the first shaft;
   (g) a second shaft carried by said frame and having a pair of crank arms secured to said second shaft, these crank arms secured and disposed at one hundred eighty degrees from each other with each crank arm adapted to move a Pitman arm connected to the crank arm at one end of the Pitman arm, said Pitman arm being connected at its other end to a reciprocably movable frame carrying at least one roller chain;
   (h) a pair of drag links each operatively connected to one of said roller chain assemblies with this connection traveling in the oblong path, the operatively connected drag links being out-of-phase with each other one hundred eighty degrees;
   (i) means for connecting said drag links to the reciprocated members so that each member is reciprocated by said drag links in a relationship that is one hundred eighty degrees out-of phase with each other, and
   (j) means for activating each of the grippers so as to grasp the travelling web only during a forward movement of each of said reciprocated members, the drag link connection as it traverses the oblong path and as carried by the movable frame providing an overlap of the grasp provided by the grippers during forward movement of the travelling web.

2. Apparatus for providing continuous motion and constant velocity to a traveling web of material as in claim 1 in which the gripper means are two opposed jaw members disposed on opposite sides of the traveling web and with the gripper means carried by the distal end of the reciprocated member, this distal end of the reciprocated member being the end not pivotally connected.

3. Apparatus for providing continuous motion and constant velocity to a traveling web of material as in claim 1 in which the traveling web includes lower and upper film webs.

4. Apparatus for providing continuous motion and constant velocity to a traveling web of material as in claim 1 in which each of the drag links is pivotally secured at its end away from the roller chain to a link arm member, the movement of said roller chain assemblies causing the drag links and connected link arm to be cycled back and forth and with each of the link arm members pivotally supported intermediate their ends by pivot means carried by the frame, and there is provided means for pivotally connecting a reciprocable member to an end of the link arm.

5. Apparatus for providing continuous motion and constant velocity to a travelling web of material as in claim 4 in which the gripper means are two opposed jaw members disposed on opposite sides of the travelling web and with the gripper means carried by the distal end of the reciprocated member, this distal end of the reciprocated member being the end not pivotally connected.

6. Apparatus for providing continuous motion and constant velocity to a travelling web of material as in claim 5 in which the motor means is an electric motor which carries a sprocket or pulley which engages and moves an endless chain or belt with this chain or belt engaging and driving a sprocket or sheave carried by and on the first shaft.

7. Apparatus for providing continuous motion and constant velocity to a travelling web of material as in claim 5 in which each of the gripper means is pneumatically actuated and deactivated.

8. Apparatus for providing continuous motion and constant velocity to a travelling web of material as in claim 7 in which the reciprocating member is an arm which is slidably carried by and on the frame.

9. Apparatus for providing continuous motion and constant velocity to a travelling web of material as in claim 4 in which the first shaft carries and rotates four like sprockets and these same sprockets engage and move four roller chain assemblies, each chain assembly being in an endless and oblong array and spaced from each other a selected distance, these chains arrayed and disposed to be moved as pairs by each Pitman arm.

10. Apparatus for providing continuous motion and constant velocity to a travelling web of material as in claim 9 in which the roller chain assemblies are arranged in tandem with two chains having a connecting shaft extending therebetween and with the connecting shaft carrying and moving a pivotally movable drag link.

11. Apparatus for providing continuous motion and constant velocity to a travelling web of material as in claim 10 in which the connecting shaft has each end sized to pass through a side plate of the roller chain and with a shoulder portion formed on the connecting shaft and adjacent each end to space and retain the inner plates of the roller chains.

12. Apparatus for providing continuous motion and constant velocity to a travelling web of material as in claim 9 in which the Pitman arm is made with a forked end adapted to move like frames providing the support of the roller chain assemblies.

13. Apparatus for providing continuous motion and constant velocity to a travelling web of material as in claim 12 in which the sliding actuation of the endless oblong roller chain array is supported by and maintained in and by slide bars disposed above and below the roller chain and with the slide bars having a portion shaped to engage the roller section of the chain.

14. Apparatus for providing continuous motion and constant velocity to a travelling web of material as in claim 13 in which the movable frame carrying the oblong roller chain assembly includes an interior spacer plate disposed so as to support outer plate members secured thereto and with the upper slide bar made as two members to provide a space in between when mounted, said space providing access to the exterior of the roller chain for engagement and propulsion of this roller chain by an associated sprocket carried on the first shaft.

15. Apparatus for providing continuous motion and constant velocity to a travelling web of material as in claim 14 in which the interior spacer plate includes slots through which cap screws extend to enter threaded holes in the outer plate members and said slots provide adjustment for a roller chain assembly to be brought to the desired degree of tautness.

16. Apparatus for providing continuous motion and constant velocity to a travelling web of material as in claim 4 in which the lever arms are longer arms substantially vertically disposed and the pivotal mounting of these longer arms provide a selected ratio of movement of the longer lever arms and the reciprocated members and with this pivot selectably shiftable to change the ratio with a minimum of difficulty.

17. Apparatus for providing continuous motion and constant velocity to a travelling web of material as in claim 16 in which the shiftable pivot includes a movable pivot block carried by and movable with the rotation of a lead screw, said lead screw carried by a support frame secured to the apparatus frame.

18. Apparatus for providing continuous motion and constant velocity to a travelling web of material as in claim 17 in which the selectively shiftable pivot includes a pair of support brackets each pivotally supporting a short lever arm, each short lever arm carried at one end by pivot means and at the other end pivotally attached to the lower end of a longer lever arm, and with each of said longer lever arm carrying a rod that is attached at each end to said longer lever arm and providing therewith and thereon a slide pivot for a pivot means that is operatively moved by the movable pivot block as it is moved by the rotation of the lead screw.

19. Apparatus for providing continuous motion and constant velocity to a travelling web of material as in claim 18 in which the lead screw carries on one end a sprocket which is rotated by a roller chain moved by a reversable motor means responsive to indicia on the travelling web.

20. Apparatus for providing continuous motion and constant velocity to a travelling web of material as in claim 16 in which the gripper means are grippers and are four in number with two grippers arranged as a first pair on opposite sides of the material and the other two grippers are arranged as a second pair and distant from the first pair, this second pair being carried and moved with and by a frame substantially one hundred eighty degrees out-of-phase with a first frame carrying the other pair of gripper means.

21. Apparatus for providing continuous motion and constant velocity to a traveling web of material as in claim 20 in which the first and second gripper pairs are each carried as a pair on transverse members extending from a channel member to an opposite channel member, each channel supported by means carried by said frame.

22. Apparatus for providing continuous motion and constant velocity to a traveling web of material as in claim 21 in which the channel members are arranged as adjacent pairs reciprocated out-of-phase with the adjacent control members, said channel members carried by upwardly extending leg portions having means for supporting a plurality of rollers carried on axles supported by said extending leg portions so as to maintain the channel members in a freely movable position above the leg portions.

23. Apparatus for providing continuous motion and constant velocity to a traveling web of material as in claim 22 in which the rollers and said axles carry these rollers as pairs which are supported and seated in cut-outs in the extending legs, these rollers of a like size and disposed to carry the channel members in a low friction manner.

24. Apparatus for providing continuous motion and constant velocity to a traveling web of material as in claim 23 in which each pair of grippers and the transverse member carrying them are moved by a pivoted transverse member adjacent the vertical link arms and these reciprocated channel members carry associated work stations.

25. A method for constructing apparatus for advancing a web of film in and with a continuous motion and constant velocity, this method including the steps of:
(a) providing and positioning a frame for the delivery and advancement of a web of material;
(b) arranging and actuating a pair of grippers disposed to alternately grasp and advance the traveling web, the grippers positioned at and on opposite sides of the traveling web;
(c) carrying each gripper on and by a reciprocated member;
(d) carrying a motor on said frame and with this motor rotating a first shaft on which is mounted at least two like roller chain sprockets secured to this shaft at a determined spacing;
(e) providing a pair of like-pitched and like-length roller chain assemblies and disposing these assemblies in an oblong endless array and carrying these chain assemblies so that the midlength is engaged and driven by one of the sprockets carried and rotated by the first shaft, said roller chain assemblies carried on two disk-like members with these disk-like members secured to a reciprocable movable frame;
(f) rotating and carrying a second shaft on said frame with two crank arms mounted on and secured to this second shaft, the crank arms moving Pitman arms pivotally connected to each crank arm at one end of the crank arm which are also pivotally connected at their other end to the reciprocated frame carrying the oblong roller chain assembly;
(g) arranging the crank arms on the second shaft so as to move the Pitman arms one hundred eighty degrees out-of-phase with each other and with a given cycloidal motion;
(h) attaching a drag link to each roller chain assembly with a connecting pivot and arranging the attaching connection so as to travel in the oblong path of the roller chain, and
(i) connecting the drag link to the reciprocated members so the one hundred eighty degrees out-of-phase movement of one lever arm is translated in a like manner to the reciprocated member and actuating the gripper associated with said member only during the forward travel of the member, the drag link connection as it traverses the oblong path and as carried by the movable frame providing an overlap of the grasp provided by the grippers during forward movement of the traveling web.

26. A method for constructing apparatus for advancing a web of film as in claim 1 in which the grippers are four in number and are arranged as pairs and include actuating a first pair of grippers with each gripper of this first pair disposed to grasp the web edges when and while moved forwardly by a frame moved by a pivoted link arm, and arranging a second pair of grippers disposed to grasp the edges of the web and actuating this second pair when and while moved forwardly by another frame moved by another pivoted link arm, each pair of grippers deactuated when and while a rearward motion is made, and with the frame carrying the first pair of grippers substantially one hundred eighty degrees out-of-phase with the second frame carrying the second pair of grippers.

27. A method for constructing apparatus for advancing a web of film as in claim 26 which further includes carrying the first pair of grippers on a transverse member supported by a channel member disposed on each side of the web of film and carrying the second pair of grippers by and on a second transverse member, said second transverse member also supported at each end by another channel member disposed on each side of the travelling web of film.

28. A method for constructing apparatus for advancing a web of film as in claim 27 which further includes arranging the channel members as pairs in a side-by-side arrangement and substantially parallel to the travel of the web of film, the channel members carrying the first transverse member independent of the channel members carrying the second transverse member.

29. A method for constructing apparatus for advancing a web of film as in claim 28 which further includes supporting the four channel members as side-by-side pairs and as pairs supporting each channel on a web support carrying a plurality of rollers with the rollers disposed to carry the channels so as to be moved with low friction and with the channels as carried by the rollers disposed to be lifted and carried above the web support.

30. A method for constructing apparatus for advancing a web of film as in claim 25 which further includes the further steps of pivotally connecting the distal end of each of the pair of drag links to link arm members which are pivotally supported intermediate their ends and with the distal end of the link arm members pivotally attached to a reciprocable member, and with the pair of reciprocable members moved one hundred eighty degrees out-of-phase from each other.

31. A method for constructing apparatus for advancing a wweb of film as in claim 30 which further includes the step of forming the gripper of and with two jaw members, said jaw members disposed on opposite sides of the traveling web.

32. A method for constructing apparatus for advancing a web of film as in claim 31 in which the gripper is pneumatically actuated.

33. A method for constructing apparatus for advancing a web of film as in claim 32 which further includes mounting on the first shaft four like sprockets in spaced array and rotating this shaft so that these same sprockets engage and move four roller chain assemblies, each roller chain assembly being in an endless array and spaced from the each other so that each chain assembly is engaged and moved by one of said sprockets, these roller chain assemblies arranged and disposed so as to be moved as pairs by a Pitman arm.

34. A method for constructing apparatus for advancing a web of film as in claim 33 in which the Pitman arm is formed with a forked end and adapted to move like frames providing a support for a roller chain assembly.

35. A method for constructing apparatus for advancing a web of film as in claim 34 which includes the further step of supporting each endless roller chain for a sliding actuation of said chain in and by slide bars disposed above and below the roller chain and with the slide bars having shaped portions adapted to engage the roller portion of the chains and with said movable frame carrying the roller chain, the upper slide bar made as two members providing a space therebetween with this space providing an access to the interior of the roller chain for engagement and propulsion of the roller chain by an associated sprocket carried on said first shaft.

36. A method for constructing apparatus for advancing a web of film as in claim 35 which includes the further step of forming the interior plates with slots through which cap screws extend to enter threaded holes in outer plate members and providing therewith adjustments for the roller chain assemblies which are brought to a desired tautness.

37. A method for constructing apparatus for advancing a web of film as in claim 35 which includes the further steps of forming the link arm members and positioning the link arm members in a vertical manner, said arms pivotally mounted and shiftable so as to provide a selected ratio movement of the link arm members, and attaching said link arm members to the reciprocated member in a pivotal manner providing a shiftable pivot axis so as to change the ratio of the lever arm motion, said shift in the pivot axis including a slide bar carried in and by a lead screw which is rotatable within a support frame carried and secured to said frame of the apparatus.

38. A method for constructing apparatus for advancing a web of film as in claim 37 which includes the further steps of forming the shiftable pivot with a pair of support brackets carried on the frame and with this pivot means on a frame attached at the upper end to a short lever arm and at the other end of this short lever arm attached by pivot means to the lower end of the longer link arm member, this longer lever arm having a slide rod mounted thereon and on which is mounted a pivot block moved by the lead screw, the rotation of said lead screw being by a roller chain and sprocket which is moved by a reversible motor.

* * * * *